United States Patent [19]

Watanabe

[11] Patent Number: 4,774,046
[45] Date of Patent: Sep. 27, 1988

[54] METHOD OF MOLDING A SYNTHETIC RESIN CONTAINER

[75] Inventor: Makoto Watanabe, Ichihara, Japan

[73] Assignee: Chugoku Pearl & Co., Ltd., Tokyo, Japan

[21] Appl. No.: 916,206

[22] Filed: Oct. 7, 1986

Related U.S. Application Data

[62] Division of Ser. No. 813,273, Dec. 24, 1985.

[51] Int. Cl.$^4$ .............................................. B29C 43/02
[52] U.S. Cl. .................................. 264/325; 264/321; 264/322; 264/554
[58] Field of Search ............... 264/554, 320, 321, 322, 264/318, 325; 425/DIG. 5

[56] References Cited

U.S. PATENT DOCUMENTS

| | | | |
|---|---|---|---|
| Re. 28,658 | 12/1975 | MacDaniel | 229/1.5 B |
| D. 173,657 | 12/1954 | James | D44/15 |
| D. 248,916 | 8/1978 | Reynolds et al. | D7/15 |
| 609,525 | 8/1898 | Stark . | |
| 1,220,495 | 3/1917 | Cadby . | |
| 1,627,050 | 5/1927 | Moore . | |
| 1,668,101 | 5/1928 | Bothe . | |
| 1,748,865 | 2/1930 | Chaplin . | |
| 2,032,343 | 3/1936 | Arthur . | |
| 2,138,364 | 11/1938 | Wassell | 206/44 |
| 2,357,399 | 9/1944 | Gregory . | |
| 2,484,656 | 10/1949 | Sikda et al. | 264/322 |
| 2,530,124 | 11/1950 | Kieckhefer | 206/65 |
| 2,534,614 | 12/1950 | Michael . | |
| 2,795,942 | 6/1957 | Harris | 65/15 |
| 3,059,810 | 10/1962 | Edwards | 220/97 |
| 3,099,377 | 7/1963 | Metzler et al. | 229/2.5 |
| 3,315,018 | 4/1967 | Commeyras | 264/51 |
| 3,337,664 | 8/1967 | Lyon | 264/554 |
| 3,342,915 | 9/1967 | Wandener | 264/554 |
| 3,414,180 | 12/1968 | Tigner | 229/1.5 |
| 3,444,282 | 5/1969 | Burkett | 264/321 |
| 3,696,987 | 10/1972 | Schuff | 229/1.5 B |
| 3,949,046 | 4/1976 | Procter | 264/296 |
| 4,150,086 | 4/1979 | Stenhall | 264/320 |
| 4,332,766 | 6/1982 | Erickson et al. | 264/322 |

FOREIGN PATENT DOCUMENTS

| | | | |
|---|---|---|---|
| 14-8078 | 5/1939 | Japan . | |
| 35193 | 11/1970 | Japan | 264/554 |
| 44184 | 12/1973 | Japan | 264/321 |
| 49-51571 | 5/1974 | Japan . | |

Primary Examiner—James Lowe
Attorney, Agent, or Firm—Wenderoth, Lind & Ponack

[57] ABSTRACT

A method of making a synthetic resin food container having a bottom wall, a side wall extending at an obtuse angle to the bottom wall and a rim or legs extending from the undersurface of the bottom wall. A device for making the container includes a male mold including a main body, a bottom forming portion received in the main body for vertical movement relative to the main body and a pressurizing portion disposed for vertical movement relative to the bottom forming portion and a female mold for receiving a portion of the bottom forming portion. The method of making the container includes the steps of forcing a portion of the bottom forcing portion into the female mold to form the bottom of the container, raising the bottom forming portion and substantially simultaneously moving the pressurizing portion to form the rim or legs on the bottom of the container.

5 Claims, 2 Drawing Sheets

METHOD OF MOLDING A SYNTHETIC RESIN CONTAINER

This application is a divisional of application Ser. No. 813,273, filed Dec. 24, 1985 and this application is also related to application Ser. No. 916,207, filed on Oct. 7, 1986, now U.S. Pat. No. 4,695,243, which is also a divisional of application Ser. No. 813,273.

BACKGROUND OF THE INVENTION

This invention relates to a synthetic resin container having a rim or legs which project downwardly from the undersurface of the bottom thereof substantially at right angles to the bottom and have a thickness and density greater than the other parts of the container and a method and a device for molding such a container.

Conventional food containers formed of synthetic resin and particularly, of foam synthetic resin such as foam polystyrene have a rim or legs which bulge downwardly from the bottom. However, the bottom rim or legs have the same thickness and density as the other parts of the container such as the side and bottom walls, for example (refer to Laid-Open Japanese Utility Model Application Publication No. 51571/1974, for example). The conventional molding devices and methods for molding containers by thermal molding synthetic resin sheet into a container have been impossible to mold the bottom rim or legs having thickness and density greater than those of the other parts of the container.

The disadvantages of the conventional synthetic resin containers for foods are that since the bottom rim or legs of the container have the same thickness and density as those of the other parts of the container, the container is unstable and tends to fall down easily and that since the bottom rim or legs merely bulge from the container bottom, when boiling water or the like is poured into the container all the parts of the container including the bottom rim or legs are soon heated to a substantially elevated temperature and the high temperature of the boiling water or the like is directly transferred to the user's fingers which contact the bottom rim or legs of the container and thus, the user can not grip the container rim or legs easily.

SUMMARY OF THE INVENTION

The present invention is to eliminate the disadvantages inherent in the conventional synthetic resin containers for foods and the conventional molding devices and methods for molding such containers. The term "synthetic resin containers" used herein implies containers obtained by thermally molding foam or non-foam synthetic resin sheet such as food containers, beverage containers, trays, receiving cases and plates on which articles are placed, for example. According to the present invention, in the molding of a synthetic resin container from synthetic resin sheet, the rim or legs are formed extending downwardly from the undersurface of the bottom of the container substantially at right angles to the bottom of the container and the thus formed rim or legs have thickness and density greater than those of the other parts of the container and thus, the container has an improved stability and will not fall down easily. Furthermore, even when boiling water is poured into the food container, since the thick bottom rim or legs exhibit heat insulation function, the user who places his fingers on the rim or legs will not feel hot.

The molding device and method of the present invention is applicable to thermal molding of foam or non-foam synthetic resin sheet, that is, vacuum moulding and/or compressed air molding.

In the molding of a container from foam or non-foam synthetic resin sheet according to the molding method of the present invention, first of all, the bottom forming portion of the male mold is placed into the mating recess in the female mold under pressure to form support means comprising a rim or legs on the undersurface of the bottom of a container being molded, the male mold is pulled up out of the recess in the female mold to leave a cavity or cavities in the rim or legs and the pressurizing portion of the male mold is then pressed against the bottom of the container to force a portion of the molten resin into the cavity or cavities in the rim or legs to thereby form a container having the bottom rim or legs having a thickness and density greater than those of the other parts of the container.

The above and other objects and attendant advantages of the present invention will be more readily apparent to those skilled in the art from a reading of the following detailed description in conjunction with the accompanying drawings which show preferred embodiments of the invention for illustration purposes only, but not for limiting the scope of the same in any way.

PREFERRED EMBODIMENTS OF THE INVENTION

Figure 1:
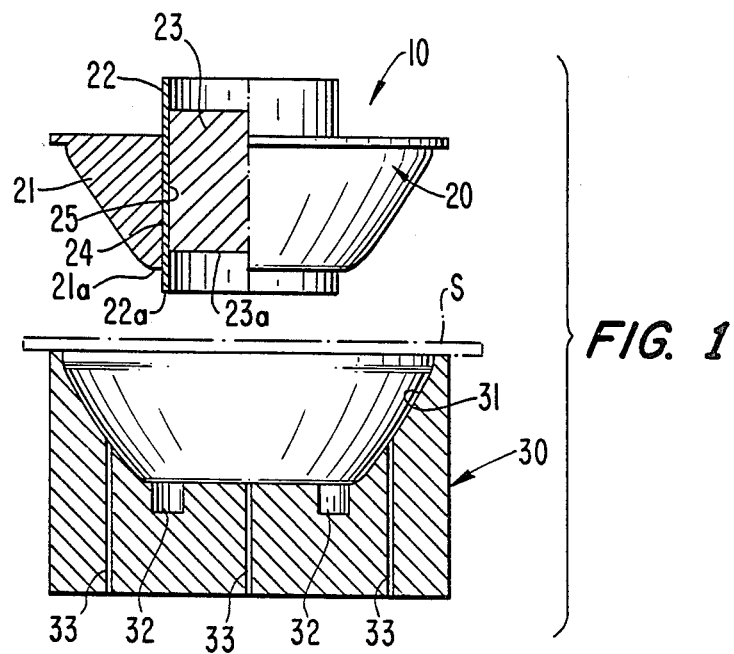
FIG. 1 is an elevational view in partial section of the male and female molds of one embodiment of the container molding device constructed in accordance with the present invention.
Figure 2:
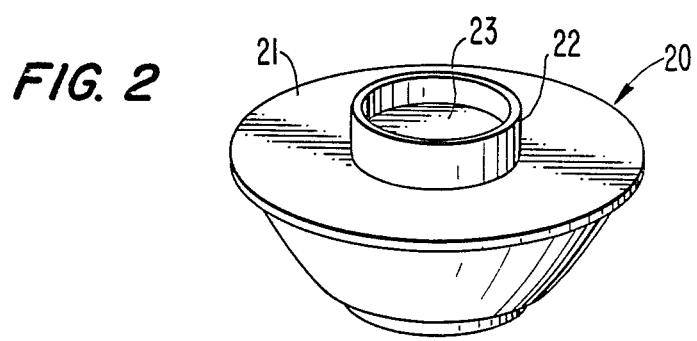
FIG. 2 is a perspective top plan view of the male mold of the container molding device shown in FIG. 1.

The present invention will be now described referring to the accompanying drawings and more particularly, to FIGS. 1 to 5 inclusive in which the first embodiment of the container molding device of the invention is shown. The embodiment of the molding device is designed to mold a food container having an elliptical cross-section as seen in horizon together with the rim on the bottom of the container by vacuum molding.

The molding device is generally shown by 10 and generally comprises a male mold 20 and a female mold 30.

The male mold 20 comprises a main body 21 having an optionally selected shape, a bottom forming portion 22 having an elliptical cross-section as seen in horizon and a pressurizing portion 23. The bottom forming portion 22 is received within a vertical through opening 24 formed in the main body 21 for vertical movement therein and the pressurizing portion 23 is received within an opening 25 defined by the bottom forming portion 22 for vertical movement therein. As more clearly shown in FIG. 1, the bottom forming portion 22 and the pressurizing portion 23 are normally so positioned that the lower edge 22a of the bottom forming portion 22 projects downwardly beyond the lower edge 21a of the main body 21 by a small distance and the lower edge 23a of the pressurizing portion 23 is positioned within the bottom forming portion 22 above the plane of the lower edge 21a of the main body 21 by a small distance, respectively.

The female mold 30 is substantially conventional except that the bottom of a cavity 31 defined by the female mold is formed with an annular recess 32, having an elliptical cross-section as seen in transverse cross section mating the bottom forming portion 22 of the male mold 20. A plurality of vacuum passages 33 extend vertically through the female mold 30 and communicate at the upper ends with the cavity 31 and at the lower ends with an external vacuum source (not shown).

The radius of curvature and position of the bottom forming portion 22 and of the recess 32 are suitably selected depending upon the radius of curvature and position of the rim on the bottom of a particular container to be molded.

Figure 3:
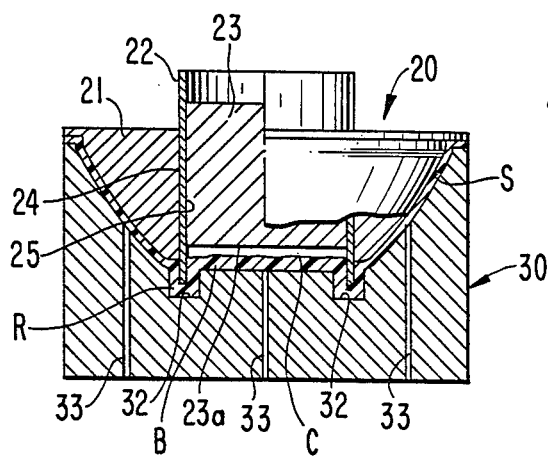
FIGS. 3 and 4 are elevational views in partial section showing different stages in the molding operation on the container molding device according to the present invention.

In order to mold a container with support means comprising the rim on the bottom thereof by the employment of the male mold 20 and female mold 30 of the molding device 10 according to the present invention, first of all, a sheet of synthetic resin S is clamped to the top of the female mold 30 in the conventional manner, softened by heating and sucked into the cavity 31 in the female mold 30 by vacuum suction provided from the external vacuum source through the vacuum passages 33 into the cavity 31 in the female mold 30. With the resin sheet S sucked in the female mold 30, the main body 21 and bottom forming portion 22 of the male mold 20 are placed into the female mold 30 under pressure leaving the pressurizing portion 23 behind as shown in FIG. 3, whereupon the resin sheet S is mold into an intermediate container product having the side wall W and an opening defined by the side wall W. In the molding of the intermediate container as mentioned hereinabove, since the lower edge 22a of the bottom forming portion 22 which normally projects beyond the lower edge 21a of the male mold main body 21 is pressed in the annular recess 32, a portion of the softened synthetic resin sheet S is caused to abut against the bottom of the recess 32 in the female mold 30 to thereby form the support means comprising the rim R on the bottom of the container to be produced. However, since the lower edge 23a of the pressurizing portion 23 of the male mold is positioned above the lower edge 21a of the male mold main body 21 by a small distance as mentioned hereinabove and thus, a clearance C is maintained between the lower edge 23a of the pressurizing portion 23 and the inner surface of the bottom of the container, the portion of the bottom of the container surrounded by the thus formed rim R on the bottom of the container remains unpressed.

Figure 4:
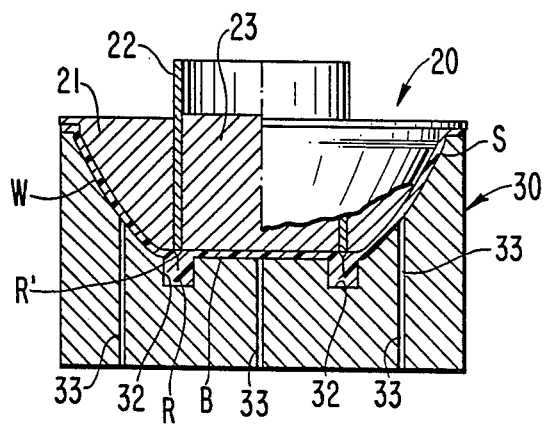
Figure 5:
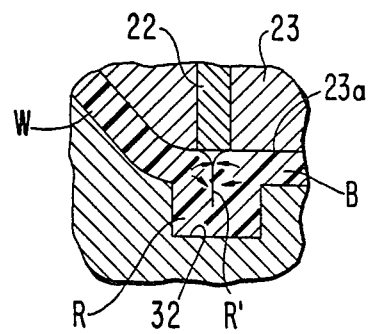
FIG. 5 is a vertically sectional view of an enlarged scale showing the forming of the rim on the bottom of a container being molded according to the method of the present invention.

Next, the bottom forming portion 22 is pulled up and substantially at the same time, the pressurizing portion 23 is pushed down as shown in FIG. 4, so that the softened resin sheet of the container bottom portion B is subjected to pressure by the pressurizing portion 23 to become the finished or complete container bottom and the softened resin sheet is forced to enter the cavity R' left in the bottom rim R as a result of the male mold bottom forming portion 22 being pulled up and fills up the cavity R' as the resin sheet sets in the cavity R'. The complete container is removed from the molding device by after cooling the container in the conventional manner until the same cools to a desired hardness.

Figure 6:
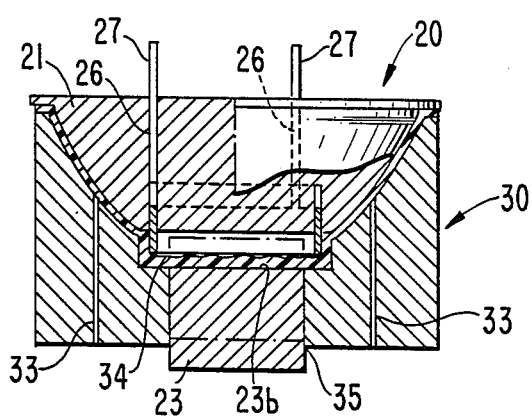
FIG. 6 is an elevational view in partial section of another embodiment of the molding device according to the present invention.

Turning now to FIG. 6 which shows another embodiment of the container molding device according to the present invention. In the second embodiment, the corresponding parts are shown by the same numerals as those used in the first embodiment and the main body 21 of the male mold 20 is formed with a plurality of vertical through guide holes 26. The bottom forming portion 22 of the male mold is suspended by a plurality of suspension bars 27 each received in the corresponding guide hole 26 to be guided therealong so that the bottom forming portion 22 is movable vertically relative to the main body 21 of the male mold 20. The female mold 30 is concaved inwardly of the annular recess 32 as shown by 34 and the concaved portion 34 is formed with a vertical through opening 35 for receiving the male mold pressurizing portion 23 which is positioned below the bottom forming portion 22 in the embodiment of FIG. 6 instead of being positioned within the bottom forming portion 22 as in the first embodiment. The upper surface 23b of the pressurizing portion 23 normally lies in the plane of the upper surface of the concaved portion 34.

In the molding of a synthetic resin container by the use of the embodiment of FIG. 6, the male mold 20 is placed into the concaved portion 34 of the female mold 30 under pressure in the same manner as in the first embodiment to pressurize the heated molten synthetic resin sheet clamped to the top of the female mold 30. The bottom forming portion 22 and pressurizing portion 23 are then substantially simultaneously raised whereby the portion of the molten resin sheet S forming the bottom B of the container is molded into the bottom B with the support means comprising the rim R of the container and a portion of the bottom forming resin is forced into the cavity left in the rim as a result of the raising of the male mold bottom forming portion 22.

In the two embodiments of the container molding device according to the invention described hereinabove, the endless rim of the bottom of a container is formed by the elliptical cross-section bottom forming portion 22 of the male mold 20 and the mating recess 32 in the female mold 30, but when the bottom forming portion 22 and the mating recess 32 are formed as having a discontinuous contour, the bottom of the molded container may be provided with legs in desired positions of the undersurface of the bottom.

Figure 7A:
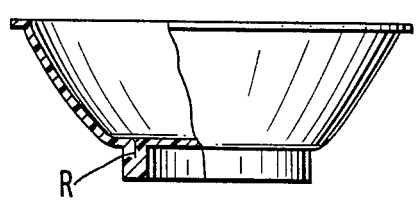
FIG. 7A is an elevational view in partial section of a bowl-shaped food container embodying the present invention.
Figure 7B:
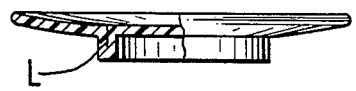
FIG. 7B is an elevational view in partial section of a dish-shaped food container embodying the present invention.

FIG. 7A shows a container with the support means comprising the bottom rim produced by the present invention and FIG. 7B shows a different container with the support means comprising legs produced by the present invention.

While the present invention has been particularly shown and described with reference to the preferred embodiments thereof, it will be understood by those skilled in the art that various changes in form and details may be made therein without departing from the spirit and scope of the invention.

What is claimed is:

1. A method of molding a synthetic resin container for foods in a molding device comprising a male mold including a main body having a lower edge, a bottom forming portion received in said main body for vertical movement therein and having a lower edge, said bottom forming portion being normally so held in the main body that the lower edge of the bottom forming portion projects downwardly beyond the lower edge of said main body by a small distance, and a pressurizing portion vertically movable relative to said main body and bottom forming portion and normally spaced from the lower edge of said main body to define a clearance therebetween; and a female mold having a mating recess for receiving said lower edge of the bottom forming portion therein, comprising the steps of placing a sheet of synthetic resin over the recess of the female mould, placing the lower edge of said bottom forming portion under pressure into said recess in the female mold to partially form the bottom of said container having support means extending downwardly from the bottom of the container, raising said bottom forming portion from said recess to leave a cavity in said support means and substantially simultaneously moving said pressurizing portion against the bottom of the container to finally form the bottom of the container and force the synthetic resin of the container into said cavity left in the support means to thereby finally form the support means.

2. The method as set forth in claim 1, in which said support means is the rim on the bottom of said container.

3. The method as set forth in claim 1, in which said support means are legs on the bottom.

4. The method as set forth in claim 1, wherein said step of moving said pressurizing portion is performed by moving the pressurizing portion in the opposite direction as said bottom forming portion during said step of raising said bottom forming portion.

5. The method as set forth in claim 1, wherein said step of moving said pressurizing portion is performed by moving the pressurizing portion in the same direction as said bottom forming portion during said step of raising said bottom forming portion.

* * * * *